July 23, 1946.                    C. A. LOVELL ET AL                    2,404,387
                            ELECTRICAL COMPUTING SYSTEM
                               Filed May 1, 1941                   2 Sheets-Sheet 1

INPUT                                                                    OUTPUT

INVENTORS:  C. A. LOVELL
            D. B. PARKINSON
            B. T. WEBER
BY
                                                                 ATTORNEY

INVENTORS: C.A. LOVELL
D.B. PARKINSON
B.T. WEBER
BY
ATTORNEY

Patented July 23, 1946

2,404,387

UNITED STATES PATENT OFFICE 2,404,387

ELECTRICAL COMPUTING SYSTEM

Clarence A. Lovell and David B. Parkinson, Maplewood, N. J., and Bruce T. Weber, New York, N. Y., assignors to Bell Telephone Laboratories, Incorporated, New York, N. Y., a corporation of New York Application May 1, 1941, Serial No. 391,439

4 Claims. (Cl. 235—61)

This invention relates to electrical computing systems, and particularly to systems including comparison circuits associated with servo-motors.

The object of the invention is the solution of an equation, or a system of simultaneous equations, in which the data are represented by electrical quantities.

A feature of the invention is a system in which electric elements and mechanical motions are combined to form representations of mathematical functions whose arguments are indicated by the mechanical motions.

Another feature of the invention is a comparison circuit, associated with a servo-motor, which continuously compares a plurality of input voltages and supplies a voltage equal to the deviation of the sum of the input voltages from zero to control the servo-motor in reducing the deviation to any desired small value.

An important form of the invention is a device which, when supplied with electrical voltages proportional to two sides of a triangle, will set itself to indicate an angle of the triangle and to produce a voltage proportional to the other side of the triangle.

Another form of the invention is a device which, when supplied with voltages proportional to the rectangular coordinates of a point, will set itself to indicate the polar coordinates of the point.

Other modifications, features and advantages of the invention will be apparent from the following description, and the drawings, in which Fig. 1 is a partly diagrammatical elevation of a system embodying the invention;

Figure 5:
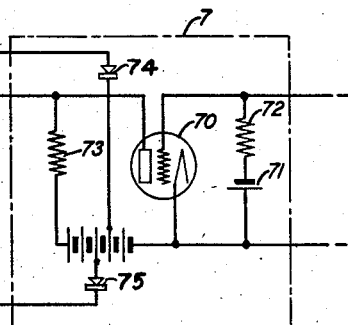
Figure 5:
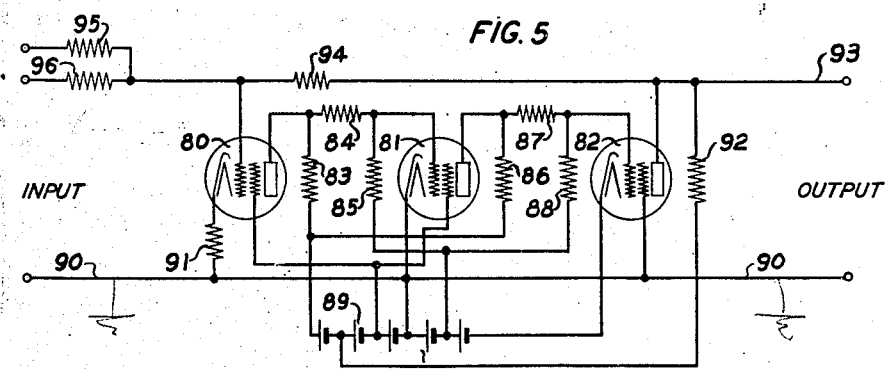
Figure 3:
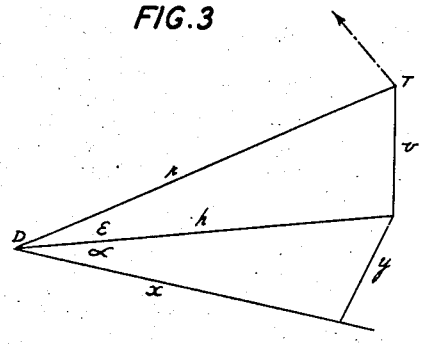
Fig. 3 is a geometrical figure illustrating one application of the invention.
Figure 4:
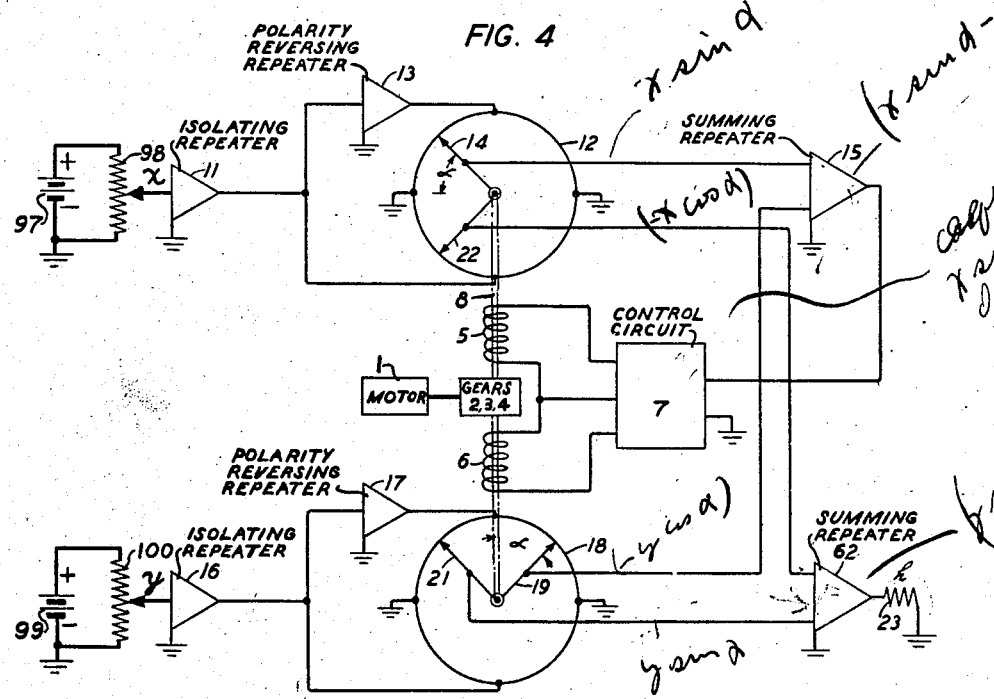

Fig. 4 diagrammatically and schematically shows an embodiment of the invention for solving the equations involved in Fig. 3; and Fig. 5 schematically shows a summing repeater.

From one point of view, the present invention may be considered as an extension and elaboration of the system disclosed in U. S. Patent 2,003,913, June 4, 1935, E. C. Wente. While the disclosure of this patent has been selected for the purpose of illustration, the invention is not limited to this specific device, but may be adapted for use with many other forms of servo-motors.

In U. S. Patent 2,003,913, for some predetermined value of biasing voltage on the grids of the vacuum tubes, the impedance of the anode-cathode circuits of the vacuum tubes is balanced against the resistance of the resistor 34, and both clutches are disengaged. As the patentee is primarily interested in measuring electrical power, which is inherently a positive quantity, he has chosen the position of balance so that, in the absence of any signal voltage, the wiper of the potentiometer will be in one extreme position. If a voltage $e$ be applied to the input circuit, a variable fraction $K$ of this voltage will be selected by the potentiometer and supplied to the amplifier. This voltage is balanced against the voltage $E$ in the control circuit to produce a deviation voltage $\delta e$, thus $$\delta e = Ke - E \qquad (1)$$

The shaft of the servo-motor is coupled by the clutches to the brush of the potentiometer so that its motion under the control of $\delta e$ tends to set the wipers of the potentiometer to make $\delta e = 0$. In this condition $$Ke - E = 0 \qquad (2)$$

The patented device thus can solve a linear equation, having the right-hand member equal to zero, by varying one term, $K$, of the equation.

In using a device of this character in accordance with the present invention where the input voltages may be positive or negative, the biasing voltage preferably is adjusted so that the clutches are in the released position in the middle of the range, thus establishing a virtual zero value, and any deviation from this value will operate the clutches to move the potentiometer wipers to reduce this deviation to a small value, or zero.

The nature of the extensions made in the field of use of the patented device by the present invention may be expressed in a generalized formula.

In the present invention, a single servo-motor may be controlled by a deviation voltage having the form $$\delta e = \sum_{i=1}^{n} f_i(\theta) + b \qquad (3)$$

where $\theta$ is any argument in a form which may be controlled by the shaft of the servo-motor and $b$ is any constant. The servo-motor will thus simultaneously solve any number of equations all having the same argument.

A clearer understanding of the nature and advantages of the first extension in the field of use will be obtained from the following description, which is intended only as an illustration of the use of the invention and not as any limitation thereon.

Figure 1:
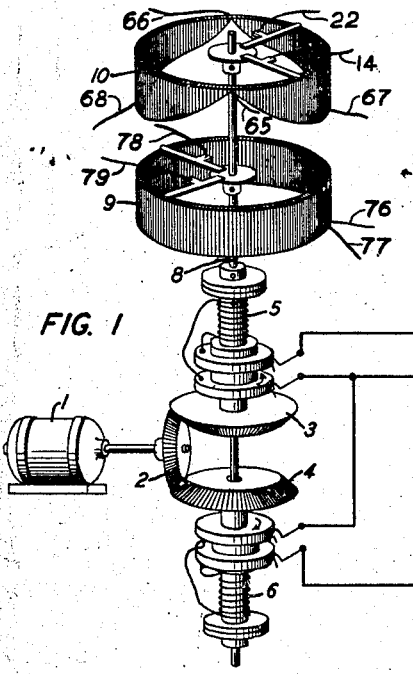

In Fig. 1, the motor 1, differential gears 2, 3, 4, magnetic clutches 5, 6, and control circuit 7, for the purposes of discussion of the invention, may be generally similar to the corresponding parts in U. S. Patent 2,003,913. As the present device may be operated on slowly varying voltages, the rectifiers may be omitted, and, if desired, a single vacuum tube 70 used. The control voltages are applied to the input circuit of the vacuum tube 70. The control electrode of the vacuum tube 70 is biased by the source of voltage 71 applied through resistor 72. The resistor 73 corresponds to the load resistor 34 disclosed in Patent 2,003,913. The clutch coils 5, 6, and associated unilateral devices 74, 75, operate in a similar manner to the corresponding devices in United States Patent 2,003,913. Any desired standard voltage, which may be zero, is applied to the input of vacuum tube 70, and the bias voltage from the source 71 adjusted to make the anode-cathode resistance of vacuum tube 70 equal to the resistor 73. The clutch coils 5, 6 are thus connected to substantially equipotential points and are not operated. If any other voltage be applied to the input of vacuum tube 70, this balance will be upset and the appropriate coil 5 or 6 will be energized. The shaft 8 is extended to carry the wipers of several potentiometers which are insulated from the shaft, and from each other, illustrated by the potentiometers 9, 10. While only two potentiometers are shown, it is apparent that many more potentiometers may be operated by the one shaft. These potentiometers may have one or more wipers as desired. Some of the potentiometers may be directly concerned in controlling the voltages supplied to the control circuit 7, while other potentiometers may control independent circuits in accordance with the motion of the shaft 8 as set by the voltages supplied to the control circuit 7.

Figure 2A:
Figs. 2A and 2B show a potentiometer card used in the system.
Figure 2B:
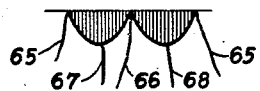

In many cases, the solution of geometrical problems involves the use of functions of the geometrical quantities concerned, such as the trigonometrical functions of the angles concerned. The potentiometer 10 has a winding varying in resistance per unit length in accordance with the sine function of an angle to illustrate this feature of the invention. The potentiometers may conveniently be of the known form in which resistance wire is wound around a flat strip, which is subsequently formed into a circle. The wire on the top edge of the strip is bared, and the wiper arranged, when rotated, to rub over the bare wires. The flat strip is shaped to produce the desired variation of resistance with movement of the wiper. To insure good contact at all positions between the wiper and the winding, the upper edge of the card should be straight. Now, as shown in Fig. 2A, a normal sinusoidal function has a positive variation from 0 to 180 degrees, with a positive maximum at 90 degrees, and a negative variation from 180 to 360 degrees with a negative maximum at 270 degrees. Such a card does not provide a straight surface for the wiper, and will introduce such mechanical difficulties as to render it impracticable. Preferably, the potentiometer is made as shown in Fig. 2B, in which the wire may be wound on a single card of the shape shown, or on two similar cards, each having the shape of one half of the card shown in Fig. 2A and the wiper is in contact with a straight surface throughout the revolution. The circuit may conveniently be arranged so that the potentiometer is grounded by the leads 67, 68, though such a connection is not essential, and other connections may be used if desired. The control voltage is supplied directly to the leads 65, 65 of the potentiometer shown in Fig. 2B, but, owing to the inversion of sign in the function, the polarity of the voltage supplied to the lead 66 of the potentiometer must be reversed.

The potentiometer 9 may have a uniform winding connected to leads 76, 77, or may have a winding with resistance per unit length varying in accordance with any desired function, or varying in accordance with a set of values empirically determined. The leads 78, 79 connected to the wipers may supply the selected voltages to any desired circuit.

In Fig. 3, the rectangular coordinates, $x$, $y$, $v$ of a point T with respect to a point D have been determined in the form of voltages proportional to the coordinates. The problem is to determine the angles of azimuth $\alpha$ and elevation $\epsilon$, and to produce a voltage proportional to the slant distance $r$ from D to T. The line of zero azimuth may be assumed along the $x$ axis. This is the type of problem frequently encountered in the control of anti-aircraft artillery, though the invention is not limited to this specific use.

Designating the hypotenuse of the $xy$ triangle by $h$, the horizontal range, from simple trigonometry, we have $$x = h \cos \alpha \qquad (4)$$
$$y = h \sin \alpha \qquad (5)$$

Thus, $$x \sin \alpha = h \cos \alpha \sin \alpha \qquad (6)$$
$$y \cos \alpha = h \sin \alpha \cos \alpha \qquad (7)$$
$$x \cos \alpha = h \cos^2 \alpha \qquad (8)$$
$$y \sin \alpha = h \sin^2 \alpha \qquad (9)$$
$$x \sin \alpha - y \cos \alpha = 0 \qquad (10)$$

From which $$x \cos \alpha + y \sin \alpha = h \qquad (11)$$

In Fig. 4 a source of voltage 97 is connected across the winding of a potentiometer 98 and the wiper of potentiometer 98 is adjusted to select a voltage proportional to $x$ which is supplied through an isolating repeater 11 of unit gain, to the lower diametrical point 65 of the potentiometer winding 12, of the type shown in Fig. 2B. Voltage is also supplied through the polarity reversing repeater 13 of unit gain to the upper diametrical point 66 of the winding 12. For clarity of illustration, a single line is used to designate a circuit, the grounds shown on the various repeaters signifying that one side of both the input and the output circuits are grounded, thus completing the return paths of the various circuits through the ground.

Assume the voltage proportional to $x$, supplied to the repeater 11, is positive, that the repeater 11 reverses or inverts the polarity to make it negative, and that the repeater 13 again inverts or reverses the polarity. The voltage supplied to the point 65 will be proportional to $-x$, and the voltage supplied to the point 66 will be proportional to $+x$. As the resistance of the potentiometer 12 varies per unit length in accordance with a sinusoidal function, the voltage above ground of the winding of the potentiometer 12 will vary as a sinusoidal function. If zero angle be at the point 67, and the wiper 14 rotates in a counter-clockwise direction, the potential of the wiper 14 with respect to ground will vary from zero to positive maximum to zero to negative maximum back to zero, and this is the variation of a positive sine. If zero angle be at the point 67 and the wiper 14 rotates in a clockwise direction, the potential of the wiper 14 with respect to ground will vary from zero to negative maximum to zero to positive maximum back to zero and this is a variation which may be termed a negative sine. If the polarities of the potentials applied to the points 65, 66 be reversed, the sign of the functional variation of the potential of the wiper 14 will also be reversed. If zero angle be at the point 68, and the wiper 14 rotates in a clockwise direction, the potential of the wiper 14 with respect to ground will vary as a positive sine, whereas, if the wiper 14 rotates in a counter-clockwise direction, the potential of the wiper 14 with respect to ground will vary as a negative sine. Also, reversing the direction of the wiper 14 through 180 degrees will reverse the sign of the function. Thus, any odd number of the following changes will reverse the sign of the function, reverse the direction of rotation, reverse the polarities of the applied voltages, reverse the location of the zero angle, reverse the direction of the wiper.

If zero angle be at the point 67, and the wiper 14 rotates counter-clockwise, as the potential of the wiper 14 with respect to ground varies as a positive sine, the potential of the wiper 22, which leads the wiper 14 by 90 degrees, will vary from positive maximum, to zero, to negative maximum to zero to positive maximum and this is the variation of a positive cosine. If the direction of the wiper 22 be reversed, so that the wiper 22 lags behind the wiper 14 by 90 degrees, the potential of the wiper 22 with respect to ground will vary as what may be termed a negative cosine. Thus, if a cosine wiper leads a sine wiper by 90 degrees, the cosine has the same sign as the sine; whereas, if a cosine wiper lags behind a sine wiper by 90 degrees, the cosine has the opposite sign to the sine.

The wiper 14 is moved in a counter-clockwise direction from the point 67 from ground through the angle $\alpha$, as yet undetermined, thus the voltage supplied by the wiper 14 to the summing repeater 15 is proportional to $x \sin \alpha$.

A source of voltage 99 is connected across the winding of a potentiometer 100 and the wiper of the potentiometer 100 is adjusted to select a voltage proportional to $y$ which is supplied through the isolating repeater 16, and the polarity reversing repeater 17 to the diametrical points of the winding of the potentiometer 18 of the type shown in Fig. 2B. As $y$ is to be multiplied by the negative cosine of $\alpha$, and the negative cosine function is the same as a sine function displaced by 90 degrees, the wiper 19 is mounted on the shaft 8, on which wiper 14 is also mounted, at an angle of lag of 90 degrees compared to the wiper 14. The voltage from the wiper 19 supplied to the summing repeater 15 is then proportional to $-y \cos \alpha$. Thus the voltage supplied to the comparison circuit has the the form $\delta e = x \sin \alpha - y \cos \alpha$ and this is an illustration of the first extension. The summing repeater 15, which may be of the type shown in Fig. 5, is a thermionic repeater comprising three vacuum tubes 80, 81, 82. As this repeater may operate with low frequency or slowly varying voltages, the interstage networks, formed by resistors 83, 84, 85 and resistors 86, 87, 88, may be of the type shown in United States Patent 1,751,527, March 25, 1930, H. Nyquist. Any other suitable networks may be used, depending upon the frequency range to be repeated. Positive voltage from the source 89 is supplied through resistors 83, 86 to the anodes of vacuum tubes 80, 81. Negative voltage from the source 89 is supplied through resistors 85, 88 to the control electrodes of repeaters 81, 82. An intermediate tap of the source 89 is connected to connection 90 and may be grounded.

The control grid of the vacuum tube 80 may be self-biased in the usual manner by the cathode resistor 91.

For convenience in securing a high gain, so as to provide a large amount of feedback, the vacuum tubes 80, 81, 82 may be screen grid tubes, the screen grids being connected to suitable taps of the source 89.

Negative voltage is supplied from the source 89 to the cathode of the vacuum tube 82, and positive voltage is supplied from the source 89 through resistor 92 to the anode of the vacuum tube 82. By suitably proportioning the circuit elements, the voltages applied to the cathode, control grid and anode of the vacuum tube 82 may be made of such value that the current flowing in the resistor 92 produces a voltage drop equal to the positive voltage from the source 89. Thus, in the absence of a signal voltage, the anode of the vacuum tube 82, and the terminal 93 have the same potential as the wire 90 and no potential is supplied to the output circuit. The negative potential from the source 89 maintains the anode-cathode current in the vacuum tube 82.

Assume that a signal voltage is applied to the control grid of vacuum tube 80, so as to make the control grid more negative. The control grid of vacuum tube 81 will become more positive, thus causing the control grid of vacuum tube 82 to become more negative, decreasing the anode-cathode current of the vacuum tube 82 and the voltage drop in resistor 92 and causing the terminal 93 to become more positive with respect to the wire 90. The repeater thus reverses the polarity of the applied signal voltage.

A large value of reverse feedback is supplied through resistor 94 from the anode of vacuum tube 82 to the control grid of vacuum tube 80. As is well known a reverse feedback of this type reduces the apparent input impedance of the vacuum tube 80, as viewed from the input circuit, to a very low value. Thus, a plurality of input voltages, respectively connected from the grounded wire 90 through individual resistors 95, 96 to the signal grid of vacuum tube 80 will each individually affect the vacuum tube 80 without interaction, and the resultant effect will be the algebraic sum of the applied voltages.

As a large value of feedback is used, the voltage gain of the repeater is largely controlled by the feedback loop. Thus, for each input, the voltage gain is proportional to the ratio of the resistance of the resistor 94 to the resistance of the input resistor, such as 95 or 96. If these resistances are equal, the voltage gain of the repeater is unity. The output voltage from the summing repeater 15 is supplied to the control circuit 7, and causes the excitation of one or the other of the clutch magnets 5, 6 rotating the shaft 8 to such an angle $\alpha$ as will make the input voltage, $\delta e$ to the control circuit 7 equal to zero, that is, $x \sin \alpha - y \cos \alpha = 0$. The position of the wipers then indicates the angle $\alpha$. As there is no theoretical limitation on the size of the motor 1 or gears 2, and the accuracy and sensitivity of the control by the clutch magnets is not affected by the power controlled, the drive may be made powerful enough to directly control some device, such as an anti-aircraft gun, rotating the gun in azimuth to the angle indicated by the coordinates $x$ and $y$.

The wiper 21 is parallel to the wiper 14 and will thus supply a voltage $y \sin \alpha$ to the summing repeater 62. The wiper 22 is 90 degrees from the wiper 14 and will thus supply a voltage $x \cos \alpha_1$, and, as wiper 22 is 180 degrees from wiper 19, this voltage will be of opposite polarity, that is, the voltage supplied to the summing repeater 62 will be $+x \cos \alpha$. The voltage produced in the output of the repeater 62, say, across the resistor 23, will be proportional to $$x \cos \alpha + y \sin \alpha = h$$

the horizontal range. If $h$ were needed as a motion a second servo-motor could be used to generate the desired motion by associating with the motion a variable voltage to compare with the voltage $h$.

If the repeater 62 reverses the sign of the potential representing $h$, so that the sign of this potential is opposite to the sign of the potential representing $v$, then, when these potentials are applied to the device shown in Fig. 4, the potential reversing repeater 11, or 16, as required, may be omitted, so that the applied potentials will be of the same sign as $x$ and $y$.

If we now apply the voltage $h$ in place of $x$ to a second system as shown in Fig. 4, and apply the voltage $v$ in place of $y$, the wiper 14 will select a voltage proportional to $h \sin \epsilon$, and the wiper 19 will select a voltage proportional to $-v \cos \epsilon$, and the sum of these voltages $\delta e$, supplied to the control circuit 7, will cause the shaft 8 to rotate to indicate the angle $\epsilon$. At the same time the wiper 21 will select a voltage proportional to $v \sin \epsilon$, and the wiper 22 will select a voltage proportional to $h \cos \epsilon$, and the sum of these voltages will be a voltage in the output of the amplifier 62 equal to $h \cos \epsilon + v \sin \epsilon$, that is, $r$.

Thus, given $x$, $y$, and $v$, the two steps have solved the equations $$x = h \cos \epsilon \cos \alpha \qquad (12)$$
$$y = h \cos \epsilon \sin \alpha \qquad (13)$$
$$v = h \sin \epsilon \qquad (14)$$

to produce the angles $\alpha$ and $\epsilon$ physically and to produce a voltage proportional to $r$. The two systems may work simultaneously to produce the final result.

As discussed above, the second servo-motor may be powerful enough to directly elevate an anti-aircraft gun to the angle $\epsilon$. The voltage $r$ may be supplied to some device which will indicate the appropriate fuse setting for this range.

By the use of two of the devices disclosed in Fig. 4, a set of three equations having three unknowns has been solved. Evidently, this use of the invention may be extended to solve any number of equations by using more of the devices shown in Fig. 4.

What is claimed is:

1. In combination, resistance means to attenuate a first voltage in accordance with a sinusoidal function, wiper means to select an attenuated voltage corresponding to an angular value of said function, resistance means to attenuate a second voltage in accordance with a cosinusoidal function, wiper means to select an attenuated voltage corresponding to the same angular value of said function, means for obtaining the algebraic sum of said selected voltages means for comparing the sum of said voltages with a standard voltage and a device actuated by the deviation of said algebraic sum from said standard voltage to simultaneously adjust said selection points for successive angular values until said deviation is reduced to zero and the position of the wipers indicates said angle.

2. In combination, a source of voltage varying in magnitude with one side of a right triangle, a first potentiometer having a winding varying in resistance per unit length with a complete sinusoidal function and a first wiper, a first polarity reversing repeater, means for connecting one pole of said source to the points in said winding where said function passes through zero, and the other pole of said source to one point where said function is a maximum, and through said repeater to the other point where said function is a maximum, a second source of voltage varying in magnitude with the other side of said triangle, a second potentiometer having a winding varying in resistance per unit length with a complete sinusoidal function and a second wiper, a second polarity reversing repeater, means for connecting one pole of said second source to the points in the winding of said second potentiometer where said function passes through zero, and the other pole of said second source to one point in the winding of said second potentiometer where said function is a maximum and through said second repeater to the other point where said function is a maximum, means for simultaneously driving said wipers, said second wiper lagging 90 degrees behind said first wiper, and means for adding the voltages selected by said wipers and controlling said driving means by the sum of said voltages, whereby the displacement of said wipers indicates one angle of said triangle.

3. The combination of claim 2 with a third wiper contacting the winding of said first potentiometer and a fourth wiper contacting the winding of said second potentiometer, said wipers being driven by said driving means, said third wiper leading said first wiper and said fourth wiper leading said second wiper by 90 degrees, and means for adding the voltages selected by said third and said fourth wipers to produce a voltage proportional to the hypotenuse of said triangle.

4. In a computer, a source of voltage proportional to one side of a right triangle, potentiometer means for selecting from said source a voltage porportional to the sine of an angle of said triangle, a second source of voltage proportional to another side of said triangle, other potentiometer means for selecting from said second source a voltage proportional to the negative of the cosine of said angle, electrical means for algebraically adding said selected voltages and motor means controlled by the deviation of the sum of said selected voltages from zero to adjust both said selecting means to reduce said deviation to zero, whereby the displacement of said motor means indicates said angle.

CLARENCE A. LOVELL.
DAVID B. PARKINSON.
BRUCE T. WEBER.